Sept. 17, 1935.  T. M. HUNTER  2,014,570
VOLTAGE REGULATOR
Filed Feb. 14, 1933  5 Sheets-Sheet 1
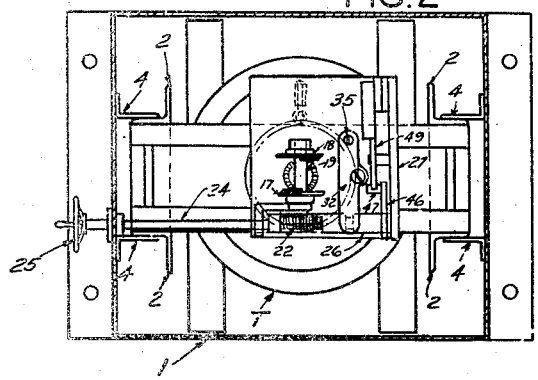
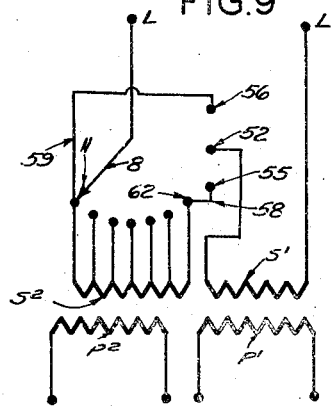
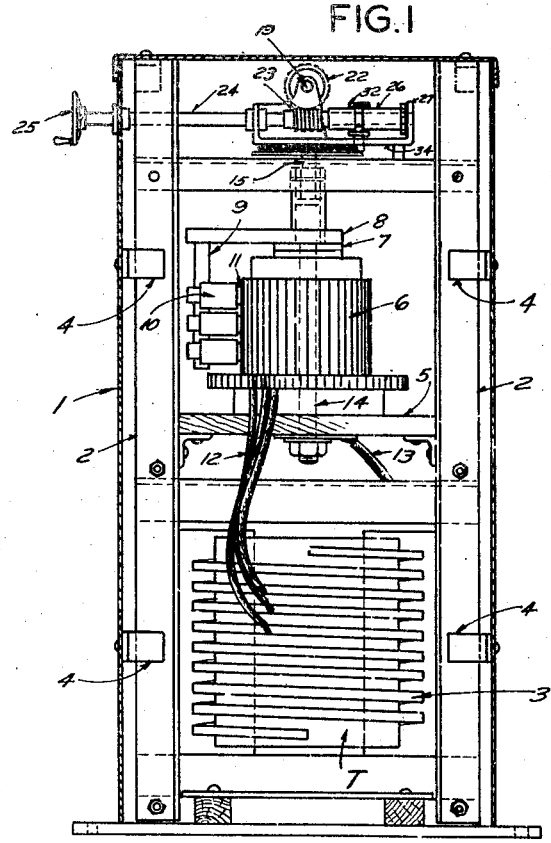
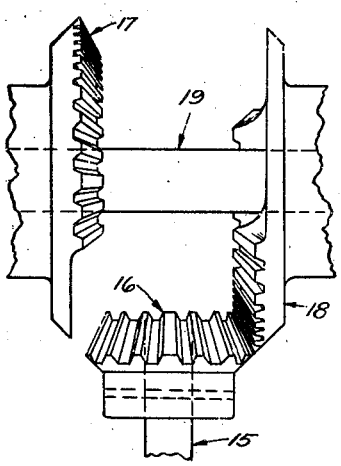
INVENTOR
THOMAS M. HUNTER
BY
A. D. T. Libby
ATTORNEY Sept. 17, 1935. T. M. HUNTER 2,014,570
VOLTAGE REGULATOR
Filed Feb. 14, 1933 5 Sheets-Sheet 2

INVENTOR
*Thomas M. Hunter*
BY
*A. D. T. Libby*
ATTORNEY

Sept. 17, 1935. T. M. HUNTER 2,014,570
VOLTAGE REGULATOR
Filed Feb. 14, 1933 5 Sheets-Sheet 3
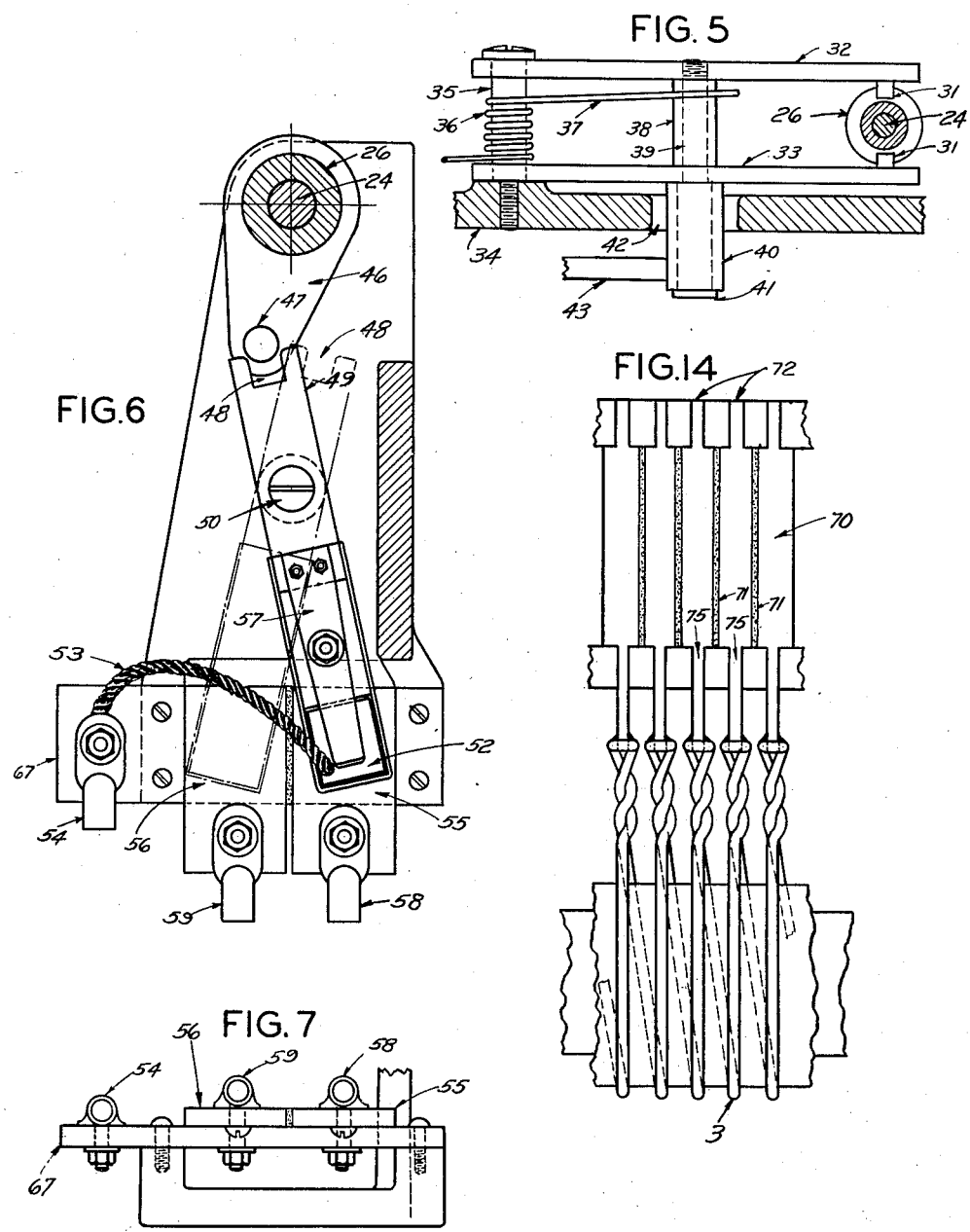
INVENTOR
*Thomas M. Hunter*
BY
*A. D. T. Libby*
ATTORNEY Sept. 17, 1935.  T. M. HUNTER  2,014,570
VOLTAGE REGULATOR
Filed Feb. 14, 1933  5 Sheets-Sheet 4
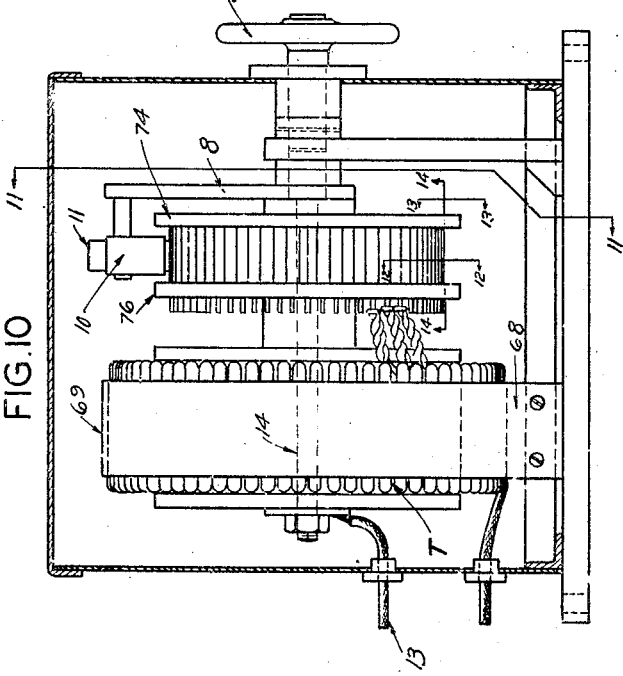
INVENTOR
Thomas M. Hunter
BY
A. D. T. Libby
ATTORNEY

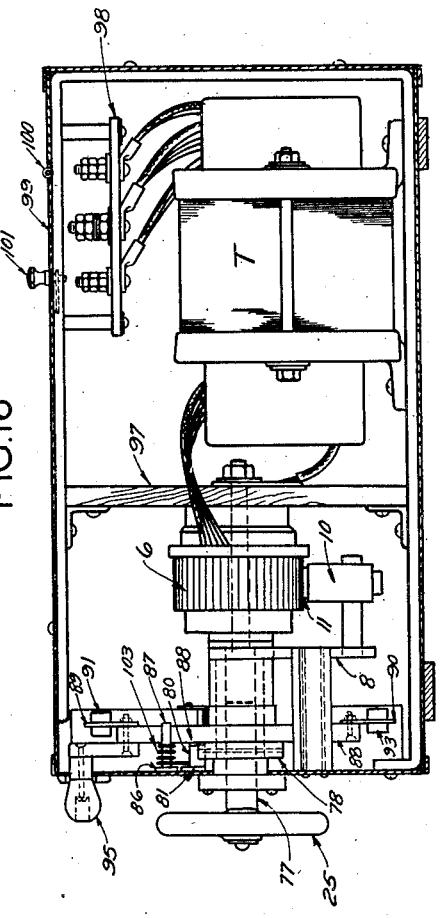
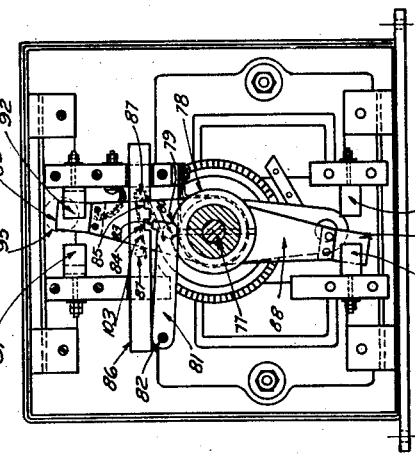
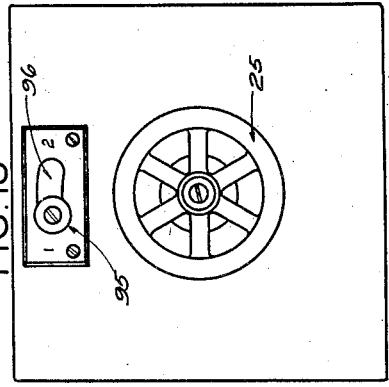
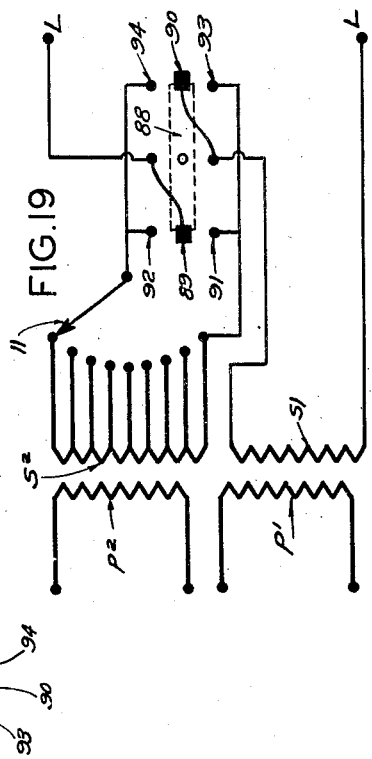

Patented Sept. 17, 1935

2,014,570

UNITED STATES PATENT OFFICE 2,014,570

VOLTAGE REGULATOR

Thomas M. Hunter, East Orange, N. J.

Application February 14, 1933, Serial No. 656,683

22 Claims. (Cl. 171—119)

This invention relates to means for regulating the voltage of an alternating current supply circuit.

My improved means, which will be hereinafter described, is especially advantageous for regulating or controlling the voltage of a circuit supplying current to various kinds of test sets and testing circuits; for example, by way of illustration, but not by way of limitation, life-testing sets for vacuum tubes and the like; control of the voltage in welding circuits, on furnaces, in theatre dimming, and feeder circuits.

I am aware of the fact that many methods of voltage regulation or control have been suggested in the past, such as induction voltage regulators, rheostats in various forms, separate reactances or reactances in combination with resistances and/or condensers, tapped transformers and different kinds of switches, and field control of the generator supplying the power circuit.

All of the above prior use methods have their specific objectionable features; for example, the induction regulator, which comprises a rotor revolving within a stator by which the relation of the windings thereon is changed, takes about 100% exciting current, with an efficiency ranging from about 50% to 90%; whereas in my arrangement, which I term a transformer regulator, the exciting current varies from 1% to 5%, and inefficiency from 90% to 98%.

Where the rheostat control is used, the efficiency is very low because of the power used up in the rheostat. Rheostats are also subject to burn-outs and cannot be readily and economically built to handle the same capacity as a transformer.

The reactance scheme of regulation is also very inefficient, besides acting out of phase with the low voltage and requiring a very high active material cost to accomplish the work desired, the cost being much higher to do the same work than by my method herein described. In addition, the efficiency of the general reactance scheme is very low, varying from 10% to 50%.

While the combination of reactance and capacity or a condensance may be made with high efficiency, yet the combination is not a flexible one and is not adapted to many applications, and its cost is high because primarily of the cost of the condenser. To get high efficiency with this arrangement, the tuning must be good, otherwise the efficiency falls off rapidly, which means a limited range of control which is easily upset by changes in the circuit or testing conditions.

The generator field type of voltage control is an excellent type of control so far as smoothness is concerned, but its overall efficiency; that is, of the motor and generator, which must be taken into account, is much lower than that of the system of this application; besides, its initial cost and cost of operation are very much higher.

Essentially, my arrangement is a tapped transformer with a tap changing device in the form of a stationary collector provided with a simple brush which is rotated about the collector. The parts carrying the brush are simple and inexpensive and relatively light, requiring very little power to operate, and are much more durable than the moving parts of the regulators heretofore proposed. Means are provided for changing from one tap to another without any detrimental short circuits so as to get maximum smoothness of control, the taps being made on the transformer at every turn or part thereof, if desirable, for the particular work to which the controller is designed, so that for all practical purposes, I can get as smooth a regulation as from the generator type of control, but at much better efficiency and a much lower cost.

Generally speaking therefore, it is the principal object of my invention to obtain a voltage regulator or controller which will attain the advantages of the best methods of control so far proposed, and of which I am aware, without the attendant disadvantages, all of which have been previously recited.

Other ancillary objects will appear to one skilled in this art after reading this specification taken in connection with the annexed drawings, wherein:

Figure 1 is an elevation of a complete regulator with the side of the casing broken away to show some of the interior parts.

Figure 2 is a plan view of Figure 1, but with the cover removed.

Figure 5 is a view on the line 5—5 of Figure 3.

Figure 6 is a view on the line 6—6 of Figure 3.

Figure 7 is a view on the line 7—7 of Figure 3.

Figure 8 is a view on the line 8—8 of Figure 3, but with the gears turned through a small angle to better illustrate the arrangement.

Figure 9 is a diagram of the connections of the transformer and controller of Figure 1 and its associated figures.

Figure 10 is a side elevation, partly in section, of a modified form of controller.

Figure 11 is a view on the line 11—11 of Figure 10.

Figure 12 is a view on the line 12—12 of Figure 10.

Figure 13 is a view on the line 13—13 of Figure 10.

Figure 14 is a view on the line 14—14 of Figure 10.

Figure 15 is a diagrammatic view of the transformer connections which may be used in the form of controller shown in Figure 10.

Figure 16 is a side view, partly in section and partly in elevation, of a further modified form of controller, embodying my principles of operation.

Figure 17 is a view of the left-hand end of Figure 16, but with the cover and certain other parts removed.

Figure 18 is a view of the left-hand end of Figure 16.

Figure 19 is a circuit diagram of the connections of the transformer shown in Figures 16 and 17.

Figures 3, 4:
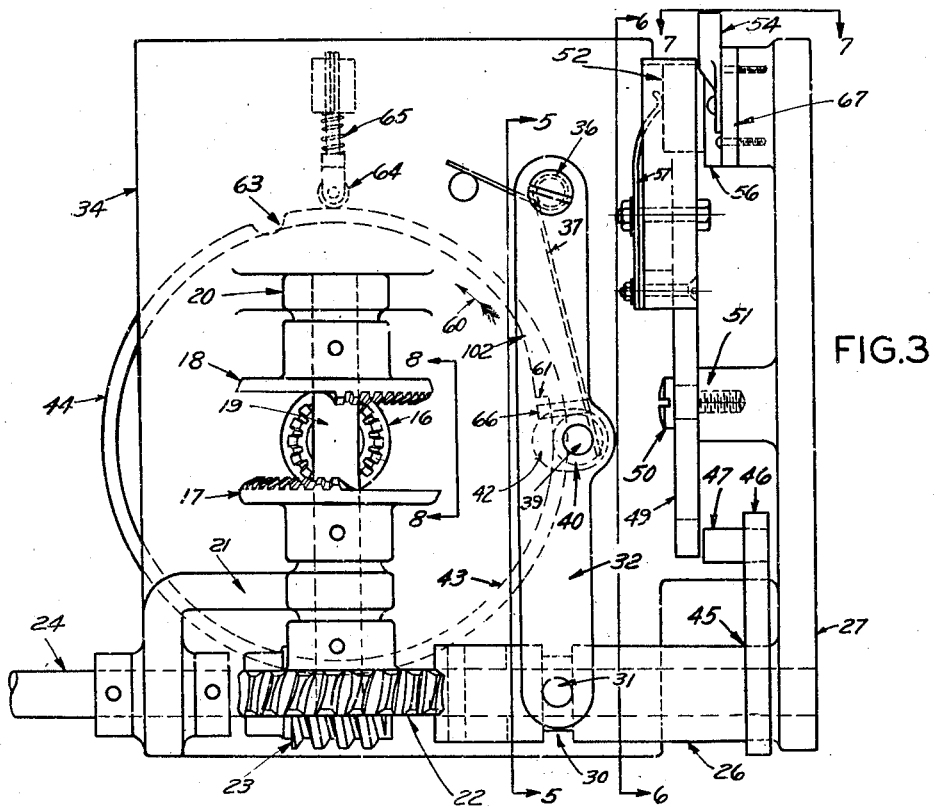
Figure 3 is a plan view of part of the control mechanism as shown in Figure 2, but on an enlarged scale.
Figure 4 is an elevational view of Figure 3.

Referring now to the details, wherein like numbers refer to the corresponding parts of the various views, I generally represents a casing enclosing a frame-work made up of a plurality of members 2 which support a transformer T having a core and windings, a part of the secondary being shown and numbered 3. The members 2 are fastened to the casing brackets 4 in any satisfactory manner as by welding.

Mounted above the transformer, which is preferably placed in the bottom of the casing, is a shelf 5. On this shelf is fastened a collector 6 made up of a plurality of bars insulated from each other in any desirable and well-known manner. The upper end of the collector carries a collar 7 on which is concentrically mounted an arm 8 which carries a brush-holder support 9 carrying one or more brush-holders 10 which in turn support brushes 11 of conducting material in contact with the collector 6. The material of the brush is such as to constitute, with the large number of taps which provide a low voltage therebetween, the means heretofore mentioned for preventing detrimental short circuits between taps. To make the drawings clear, only a few of the secondary transformer turns 3 are illustrated, and from each adjacent turn a tap 12 is taken off to consecutive collector bars.

Current is carried to the arm 8 by means of a conductor 13 connected to a central stud 14 which passes upwardly through the collector but is insulated therefrom. Also mechanically connected to, but insulated from the arm 8, is a shaft 15, to the upper end of which is fastened a bevel gear 16. The bevel gear 16 is positioned between two cooperating bevel gears 17 and 18 both of which are similarly made, but each having the gear-teeth extending only approximately halfway around the circumference of the gears for a purpose which will be later pointed out. The gears 17 and 18 are rigidly fastened to a shaft 19 which is supported by support members 20 and 21.

To one end of the shaft 19, is attached a gear-wheel 22 adapted to mesh with a worm 23 carried on an operating shaft 24. As shown in Figure 1, the operating shaft 24 may be operated by a hand-wheel 25, although it is to be understood that it may be operated by a small motor or other suitable source of power. The shaft 24, after passing through the worm 23, passes through a sleeve 26 into a bearing support arm 27. The sleeve 26 has, at the end adjacent the worm 23, a longitudinal slot 28 to receive a pin 29 carried by the shaft 24. The sleeve is also provided with a circular groove 30 in which is positioned a pair of pins 31 carried by the side lever arms 32 and 33 (see Figs. 4 and 5). The lever arms 32 and 33 are supported to a frame member 34 by a pivot pin 35 on which is positioned a spring 36 having an end 37 extending over and bearing on the bushing 38 carried by a stud 39 attached to the arms 32 and 33. On the free end of the stud 39 is carried a cylindrical roller 40, being held in place by a head 41 on the stud 39. The roller 40 is positioned in an opening 42 in the frame member 34 and is adapted to operate on the periphery of a disc 43 fastened to the shaft 15, which shaft also carries a stop disc 44, the purpose of which will be later pointed out.

On the end of the sleeve 26, adjacent the support arm 27, there is fastened to, as by welding at 45, an arm 46 carrying a pin 47 which is adapted to enter a slot 48 in the end of a switch lever 49 pivoted on a pivot pin 50 fastened to a frame stud 51. The opposite end of the switch lever 49 carries a brush or contact member 52 which, however, is insulated from the lever.

The brush 52 is connected with a flexible conductor 53 to a terminal 54 and is held in good contact engagement with contact blocks 55 and 56 carried on insulator 57, depending on which one it is in engagement with, by a spring 57. A circuit connection is made to the block 55 by means of a conductor attached to a terminal 58, and likewise a circuit connection is made to the block 56 by a wire connected to the terminal 59.

The controller which so far has been described, functions in the following manner:

Assuming that the hand-wheel 25 is turned in a clockwise direction, the shaft 24, through the medium of the worm 23 and the gear-wheel 22, will turn the gears 17 and 18 in a direction such that the gear-wheel 18 will turn the gear 16 in a counter-clockwise direction, looking at the end 35 of the gear 16. This will move the shaft 15 and the discs 43 and 44 in the direction of the arrow 60 (see Fig. 3), and the roller 40 will turn on the periphery of the disc 43 until the shoulder 61 in the periphery of the disc 43 comes around and strikes the roller 40. This allows the lever arms 32 and 33, carrying the pins 31, to move inwardly toward the worm 23 under the tension of the spring 37.

The lateral movement of the pins 31, moves the sleeve 26 toward the worm 23 and thereby laterally moves the arm 46, so that the pin 47 will engage the notch 48 in the switch-lever 49, it being understood that as the shaft 24 is turned, the sleeve 26 is also turned, and with it the arm 46, so that at the time the arm 46 and the pin 47 are started on their movement toward the lever 49, the roller 40 is at the point 102 on the disc 43. Just previous to the striking of the roller 40 against the shoulder 61, the arm 46, which is being turned with the shaft 24, is turned to the point where the pin 47 can enter the end of the slot 48 in the lever 49, as indicated by the dotted lines in Figure 6.

Since the shaft 24 travels much faster than the disc 43, the switch lever 49 will be thrown into the position of the full lines in Figure 6 just an instant before the roller 40 hits the shoulder 61. Also, at this instant, the gear 18 has passed out of mesh with the gear 16 and the roller 64, carried on the spring-operated plunger 65, drops into the notch 63 in the disc 44, thereby locking the gear 16 and the other parts connected thereto so that they will not overrun or shift their position in any manner, thus holding them in their adjusted synchronized position. An instant later, the gear 17 engages the gear 16 and reverses the direction of rotation of the shaft 15, carrying the brush-holder in reverse direction around the collector until the pin 66, carried by the disc 43, strikes the roller 40, when the right-hand movement of the wheel 25 is stopped.

During this last interval of movement, the arm 46 is not raised, so that the pin 47 does not engage the switch lever 49. The handle 25 is now rotated in reverse direction and the gear 18 will engage the gear 16, turning it in the direction first described, but the shaft 24 being turned in the opposite direction, the arm 46 will likewise be turned in the opposite direction, so that when the roller 40 reaches the point 102 on the disc 43 as has been described, the arm 46 will start to move toward the lever 49, and the pin 47 will then enter the slot 48 as shown in full lines in Figure 6, and the switch lever 49 will be thrown to the dotted position in a manner similar to the first described movement.

After the switch lever 49 is turned as first above described, the switch contact 52 will be carried over on to the block 56, thereby changing the direction of the flow of current through half of the secondary winding of the transformer (see Fig. 9), it being understood that when the contact brush 52 is on the block or contact 55, the transformer secondaries S' and S² are connected so as to add their voltages; whereas when the switch contact 52 is on the contact 56, the two parts of the transformer S' and S² are in opposition, it being noted that the two primaries P' and P² of the transformer may be connected in series or in multiple, depending on the voltage of the power supply.

While the switch lever 49 has been moved as above described, it will be understood that the shaft 15, carrying the collector arm 8 and the brush-holder 10 around the collector 6, has also been rotating a full revolution, while the drive-gear 18 has turned only a half revolution and completed its working movement, the brush-holder 10, referring to Figure 9, has traveled over approximately the whole of the collector; or referring to the diagram of Figure 9, to the point 62 where the action of the winding S² is fully cut out, at which time the roller 40 engages the shoulder stop 61 and the disc 44 has moved so that the notch 63 therein is in alignment with a stop roller 64, which functions, as has been explained, to prevent overrunning of the gears and keeps the mechanism in its original, adjusted synchronism. Continued clockwise rotation of the hand-wheel 25 in the shaft 24, brings the gear-teeth on the half of the gear 17 into mesh with the gear 16, and even though the shaft 19 is turning in the same direction, the direction of the rotation of the gear 16 will be reversed and consequently the shaft 15 with the discs 43 and 44 attached thereto, and likewise the arm 8 and the brush-holder 10 will be caused to pass over the collector back to the position shown in Figure 9, cutting in more and more turns of the secondary S² until the pin 66, carried by the disc 43, strikes the roller 40 as indicated in Figure 3, coincident with which the gear 17 passes out of mesh with the gear 16, and the gear 18 is again ready to engage the gear 16 which will reverse its direction, and likewise the shaft 15 carrying the brush-holder 10 around the collector, and throwing the switch lever 49 back to the dotted position indicated in Figure 6 and connecting the winding S² in opposition to S', when further operation of arm 8 will cut out more and more turns of S².

Thus the brush-holder 10 is moved around the collector to bring into effect the various tapped sections of the transformer winding S² while this winding has been connected in opposition or in cumulative relation with the winding S'. In place of the side-shifting of contact 52, I may use independent arms carrying contacts that may be raised and lowered onto their respective contacts 55 and 56, or an equivalent arrangement.

In the form of device shown in Figures 10 and 11, the transformer T is of the ring-core type and held in place against a support member 68 by a strap 69 which passes over the insulated conductors 3 of the secondary. If desired, additional insulation may be used between the strap and the insulated conductors of the secondary.

In this form, the collector 6 comprises a plurality of bars 70 separated by insulators 71. The ends 72 of the bars are positioned in slots in a suitable insulating piece 73 and held therein by an annular insulating collar 74 which passes over the outer periphery of the ends 72. Similarly, the support ends 75 of the bars 70 are positioned in slots in a suitable insulator held in position by a collar 76 similar to the collar 74, and positioned in substantially the same manner.

As shown in Figure 14, each turn of the secondary winding 3 is tapped and brought out to the collector bar-ends 75 in any suitable manner, one such being indicated in Figure 14. In this form of regulator, the arm 8, carrying the brush-holder 10 and brush 11, is operated directly without any gearing mechanism by the control handle or wheel 25, thereby giving a very rapid movement of the brush and consequently a quick change in the voltage. The circuit connections for this regulator are diagrammatically illustrated in Figure 15, in which the load to be regulated is connected across the terminals marked L, while the terminals of the transformer are connected to the source of power supply.

In Figures 16, 17, and 18, I have shown a further modified form of regulator having a hand-control on the collector brush, but a semi-automatic control on the reversing switch for reversing the connections of the winding S² comprising part of the secondary. In this form of regulator, the collector is substantially the same as that shown in Figure 1, but the transformer T is mounted to one side of a shelf 97 which acts as one of the supports for the collector 6. The connections to the transformer T are made through a connecting rack 98, access to which is obtained through a door 99 preferably hinged at 100 and having a handle 101 for manipulating.

A shaft 77 carries, in addition to the brush-arm 8, a collar 78 having a notch 79 therein to receive a pin 80. The pin 80 is carried in the end of a lever 81 pivoted at 82. The lever 81 has a finger 83 adapted to engage notches 84 and 85 in a sliding bar 86. The bar 86 has two pins 87 disposed on opposite sides of a switch lever 88. The switch lever 88 carries a contact 89 at one end and a contact 90 at its opposite end. The contact 89 is adapted to engage the contacts 91 and 92, while the switch contact 90 is adapted to engage the contacts 93 and 94.

Assuming now that the handle 25 and the brush-holder 10, with its brush 11, have been turned so that the pin 80 drops into the notch 79, the bar 86 will be released by reason of the finger 83 having dropped out of the notch 84 in the bar 86. When this happens, then the operator, by taking hold of the knob 95, which is left out of Figure 17 for the purpose of clarity, can move the same to the opposite end of the slot 96 (see Fig. 18), which will carry the contact 89 into engagement with the contact 91, and the contact 90 into engagement with the contact 94. At the same time, it will carry the bar 86 to the left, so that the finger 83 will be opposite the notch 85. Then when the handle 25 is moved, the pin 80 will be raised out of the notch 79 and the finger 83 will pass into the notch 85, locking the switch in this position so that it cannot be accidentally moved while the brush-holder is being rotated about the collector 6; or a full revolution is performed, after which the cycle of operation can be repeated, thereby bringing the winding S² into opposition or cumulative relationship with the winding S' as desired.

The diagram of connections for this type of controller is illustrated in Figure 19 and is similar to Figure 9, with the exception of the method of reversing the winding S².

It will be clear that the various details of the mechanisms may be varied from those illustrated, without departing from the spirit of my invention or the scope of the appended claims.

Having thus described my invention, what I claim is:

1. A voltage regulator including a transformer having its secondary divided, means for reversing the flow of current through one part of said secondary winding with respect to the other part, a fixed collector of the commutator type, a brush connected directly into the load circuit and mounted for rotation in continuous contact with and around said collector for the greater portion of the circumference thereof, taps between the collector and said winding wherein the current is reversed, and means including a single-ended arm for rotating said brush about the collector.

2. A voltage regulator as set forth in claim 1, characterized in that said reversing means can only be operated after the brush has made a predetermined movement around the collector for the major part of the circumference thereof.

3. A voltage regulator as set forth in claim 1, characterized in that said reversing means is actuated automatically after a predetermined movement of said brush around the major portion of the circumference of the collector has been made.

4. A voltage regulator including a casing, a transformer mounted within the casing, a collector of the commutator type fixedly mounted within the casing adjacent the transformer, taps taken from closely adjacent turns of a winding of the transformer connected to the parts of said collector which arcuately spans substantially a full circumference, a brush connected directly into the load circuit and mounted on a single-ended arm to continuously contact with and rotate for a major portion of its circumference around the collector, a shaft for operating the brush mounting, and means for turning said shaft.

5. A voltage regulator as set forth in claim 4, characterized in that means are provided for reversing, after movement of the brush around the collector for the major portion of its circumference, the direction of current flow through at least the winding having the taps.

6. A voltage regulator as set forth in claim 4, characterized in that said brush-operating shaft has a gear thereon, a pair of gears formed and arranged so as to operate on the first mentioned gear intermittently, and to turn the same in opposite directions, and means for operating said pair of gears.

7. A voltage regulator as set forth in claim 4, characterized in that means are provided for reversing the direction of current flow through at least the winding having the taps, said reversing means including a switch lever carrying a contact in the transformer circuit, and an operating arm therefor brought into operative relation therewith after a predetermined amount of movement of said collector brush.

8. A voltage regulator including a casing, a transformer mounted in one part of the casing, a collector of the commutator type fixedly mounted in the casing adjacent the transformer, gearing and switching mechanisms mounted in another part of the casing, taps from each turn or some part thereof of a winding of the transformer to the bars of the collector which arcuately spans substantially a full circumference, a brush connected directly into the load circuit of the transformer and mounted on a single ended arm to continuously contact with and rotate around the collector for the major portion of its circumference, said gearing mechanism being connected to rotate the brush around the collector as well as to operate the switching mechanism, said switching mechanism being connected so as to reverse the current through that winding of the transformer having the taps, and common means for actuating said gearing and switching mechanisms.

9. A voltage regulator as set forth in claim 8, further characterized in that said switching mechanism is only operated after a predetermined amount of movement of said brush around the collector for the major portion of its circumference.

10. A voltage regulator as set forth in claim 8, further characterized in that the winding switch is operated again after one operation only, following two approximate revolutions of the brush around the collector, one in one direction and the other in reverse direction, while the common means is being operated in the same direction.

11. A voltage regulator as set forth in claim 8, further characterized in that the winding switch is operated again after one operation only, following two approximate revolutions of the brush around the collector, one in one direction and the other in reverse direction, while the common means is being operated in the same direction, and further characterized in that stop means are provided to keep the said mechanisms synchronized during the instant that the switching takes place.

12. A voltage regulator as set forth in claim 8, further characterized in that the winding switch is operated again after one operation only, following two approximate revolutions of the brush around the collector, one in one direction and the other in reverse direction, while the common means is being operated in the same direction, and further characterized in that stop means are provided to keep the said mechanisms synchronized during the instant that the switching takes place, and still further characterized in that an additional stop is provided whereby said common means must be operated in reverse direction to get one revolution of the brush around the collector after said two reverse rotations of the brush.

13. A voltage regulator as set forth in claim 8, characterized in that the switching mechanism includes, a shaft extending from the gearing mechanism, a disc on the shaft and having a notch therein, a pivoted spring-operated lever having a roller to ride on said disc, a sleeve operated by said lever, said sleeve being turned by a part of said common means, an arm carried by said sleeve, and a switch lever adapted to be engaged and moved by said arm when the roller moves into said notch on the disc under the influence of said spring-operated lever.

14. A voltage regulator as set forth in claim 8, characterized in that the gearing mechanism includes a worm on said common means, a gear in mesh with said worm, a shaft carrying said gear, a pair of mutilated gears spaced on said shaft and adapted to alternately and intermittently engage another gear, a shaft extending at an angle to the first-mentioned shaft, and a gear on the second-mentioned shaft to be engaged by said mutilated gear as and for the purpose described.

15. A voltage regulator including a casing, a transformer mounted in one part of the casing, a collector fixedly mounted in the casing adjacent the transformer, taps from a winding of the transformer to the bars of the collector, a brush connected into the load circuit of the transformer and mounted to contact with and rotate around the collector, a shaft connected to said brush mounting for moving the brush, a collar carried by said shaft and having a notch therein, a release lever having a pin to engage said notch, a finger on said lever, a switch lever carrying contacts for reversing a part of the transformer winding mounted to be moved by said shaft, a locking bar carried by said switch lever and having slots therein to be engaged by said lever finger to lock the switch lever in set position until the pin on said release lever drops into said notch at the end of one revolution of said brush around the collector.

16. A voltage regulator including a casing, a transformer mounted in one part of the casing, a collector of the commutator type fixedly mounted in the casing adjacent the transformer, a relatively large number of taps from a winding of the transformer to the bars of the collector, a brush connected into the load circuit of the transformer and mounted to continuously contact with and rotate around the collector for the major portion of the circumference thereof, means including a shaft for moving the brush, a hand-operated switch for reversing at least a part of the load winding of the transformer, and means cooperating with the switch and shaft for preventing the switch from being operated until the brush is in a predetermined position on the collector.

17. A voltage regulator including, a transformer, a collector of the commutator type, taps from closely adjacent turns of a winding of the transformer to the bars of the collector, a brush connected into the load circuit of the transformer and mounted to continuously contact with and to be rotated around the major portion of the collector, means including a single-ended arm for rotating the brush around the collector, and a hand-operated switch for reversing at least a part of the load winding of the transformer with respect to another part.

18. A voltage regulator including, a transformer, a collector of the commutator type, taps from closely adjacent turns of a winding of the transformer to the bars of the collector, a brush connected directly into the load circuit of the transformer and mounted to continuously contact with and to be rotated around the major portion of the collector, means including a single-ended arm for rotating the brush around the collector, a switch for reversing at least a part of the load winding of the transformer with respect to another part, and means brought into operation at the end of the full travel of the brush in the direction of its moving stroke for determining when said switch will be operated.

19. A voltage regulator including, a transformer, a collector of the commutator type, taps from closely adjacent turns of a winding of the transformer to the bars of the collector, a brush connected directly into the load circuit of the transformer and mounted to continuously contact with and to be rotated around the major portion of the collector, means including a single-ended arm for rotating the brush around the collector, and a switch for reversing at least a part of the load winding of the transformer with respect to another part only after at least a full travel of the brush in the direction of its moving stroke.

20. A voltage regulator including, a transformer having primary and secondary windings, a voltage tap collector of the commutator type, taps having very low voltage therebetween extending from closely adjacent turns of at least a part of the secondary winding to said collector, a brush of a material having a resistance which, in cooperation with the low voltage between said taps, prevents detrimental short circuits between the bars of said commutator as the brush passes thereover, said brush continuously engaging the collector and connected directly into the load circuit of the secondary, means for reversing a part of the secondary with respect to another part only after at least a full travel of the brush in the direction of its moving stroke, and means for causing relative rotation between the brush and collector.

21. A voltage regulator including, a transformer having a relatively large number of taps from at least some part of the secondary thereof, a stationary collector of the commutator type constructed apart from and mounted in spaced relation to the transformer, said collector having bars forming substantially a full circumference to which said transformer taps are connected, a rotatable shaft, a single-ended arm carried directly by said shaft, a brush carried by said arm at its single free end in engagement with the collector bars, said brush being connected directly into the load circuit leading from the regulator at all times independent of any extraneous impedances, and means for rotating said brush in continuous contact and about said collector for substantially the full circumference thereof.

22. A voltage regulator including, a transformer, a stationary collector of the commutator type constructed apart from and mounted adjacent to the transformer, said collector having bars forming substantially a full circumference, a brush connected directly at all times to the load circuit leading from the regulator, a rotatable shaft, means including a single-ended arm carried directly by said shaft for rotatably moving said brush about the collector, taps extending from at least each turn of a winding of the transformer to the bars of said collector for substantially the full circumference thereof, and means included inherently in the brush itself for preventing a detrimental short circuit from bar to bar, thereby assisting in attaining maximum smoothness of control.

THOMAS M. HUNTER.